United States Patent [19]

Voigt

[11] Patent Number: 4,883,321
[45] Date of Patent: Nov. 28, 1989

[54] COMBINATION REAR DUMP AND BOTTOM DUMP SEMI TRAILER

[76] Inventor: Wallace D. Voigt, 5985 Sunnyside Rd., SE, Salem, Oreg. 97302

[21] Appl. No.: 139,680

[22] Filed: Dec. 30, 1987

Related U.S. Application Data

[63] Continuation-in-part of Ser. No. 856,676, Apr. 25, 1986, Pat. No. 4,733,451.

[51] Int. Cl.$^4$ .............................................. B60P 1/56
[52] U.S. Cl. ................................ 298/17.7; 105/239; 105/260; 296/184; 298/23 TT; 298/27
[58] Field of Search ............. 105/239, 258, 260, 280; 296/56, 184; 298/17 R, 26, 35 R, 23 TT, 17.7, 24, 1 R, 27

[56] References Cited

U.S. PATENT DOCUMENTS

| | | | |
|---|---|---|---|
| 888,793 | 5/1908 | Enley | 298/35 R |
| 3,552,659 | 1/1971 | Meyer | 298/27 X |
| 3,917,084 | 11/1975 | Swisher, Jr. et al. | 298/27 X |
| 4,348,047 | 9/1982 | Harshman | 296/184 |
| 4,678,235 | 7/1987 | Hagenbuch | 296/184 X |

Primary Examiner—Robert J. Spar
Assistant Examiner—Janice Krizek
Attorney, Agent, or Firm—John K. Mickevicius

[57] ABSTRACT

The present invention relates to a new type of trailer for trucks used in the construction industry. The invention discloses a combination bottom dump and end dump trailer in a single unit. The trailer generally comprises a cargo area, a bottom dump hatch in the cargo area, a tailgate door and lifting rams to lift the front of the trailer up to allow cargo to be dumped out the tailgate.

4 Claims, 6 Drawing Sheets

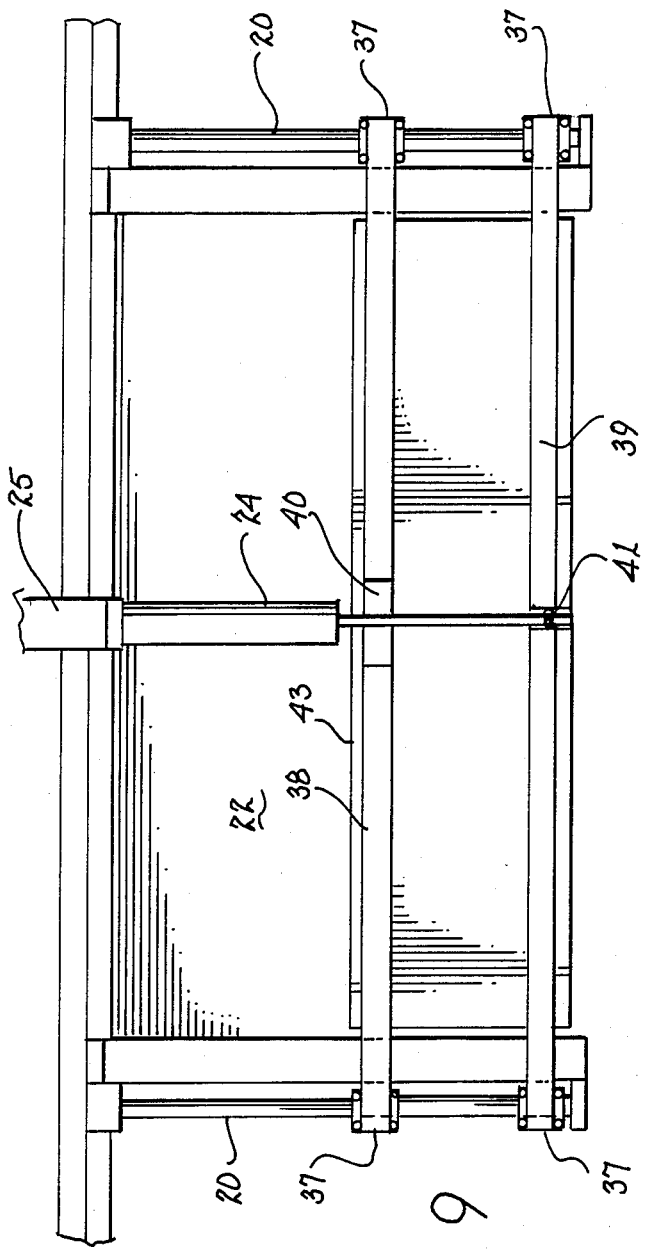
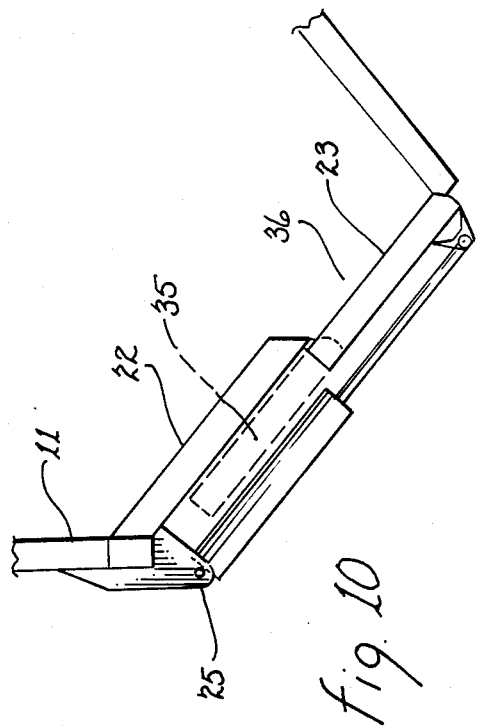
fig. 9
fig. 10

COMBINATION REAR DUMP AND BOTTOM DUMP SEMI TRAILER

This application is a Continuation in Part of Application Ser. No. 856,676 filed by the same sole inventor on Apr. 25, 1986 titled Apparatus and Method for Constructing a Combination Rear Dump and Bottom Dump Trailer, now U.S. Pat. No. 4,733,451.

BACKGROUND OF THE INVENTION

1. Field of the Invention

The present invention relates to a new type of trailer for trucks used in the construction industry. The invention discloses a combination bottom dump and tail dump trailer in a single unit and a method to build such a unit.

2. Description of the Prior Art

In hauling heavy construction materials, the type of trailer used to haul such material was heavily dependent on the material and site receiving such material. In the case of finer material such as sand, rocks, dirt or other similar material, a belly dump trailer was required. This is especially true in situations such as road building, where the material being delivered must be spread out over a relatively long area. However, if the material being delivered is coarse, such as chopped asphalt, large rocks, trees, garbage or other similar material, or if the requirement is to have the material delivered in a single large pile, then a back dump trailer is required.

The typical construction material supplier or trucking firm was therefore required to purchase, keep and maintain both types of trailers to service his entire potential market. This involved expensive duplication of equipment. Many times, a bottom dump trailer would be required, but only a back dump trailer was available. Often, the converse was also true. This resulted in the delay of shipping the requested material to the supplier's customer.

Both types of trailers —back dump and bottom dump—have been known in the art for some time. However, a combination trailer, which would provide much higher utility and which would eliminate costly duplication of delivery trailers, has not been available.

SUMMARY OF THE INVENTION

It is an object of this invention to provide an all purpose trailer for use in the construction and road building industry which can be used for those applications requiring either a tail dump or bottom dump trailer.

It is a further object of this invention to reduce capital outlay required of construction material suppliers.

It is yet another object of this invention to provide a trailer which will have a much higher utilization than that currently offered by available trailers.

It is a still further object of this invention to provide a material for building such a trailer.

The foregoing and other objects, features and advantages of this invention will be apparent from the following, more particular, description of the preferred embodiments of this invention, as illustrated in the accompanying drawings.

BRIEF DESCRIPTION OF THE DRAWINGS

FIG. 9 shows a side view of the bottom dump doors in a closed position.

FIG. 10 shows a cross section of the bottom dump doors.

DETAILED DESCRIPTION OF THE PREFERRED EMBODIMENT

Figure 1:
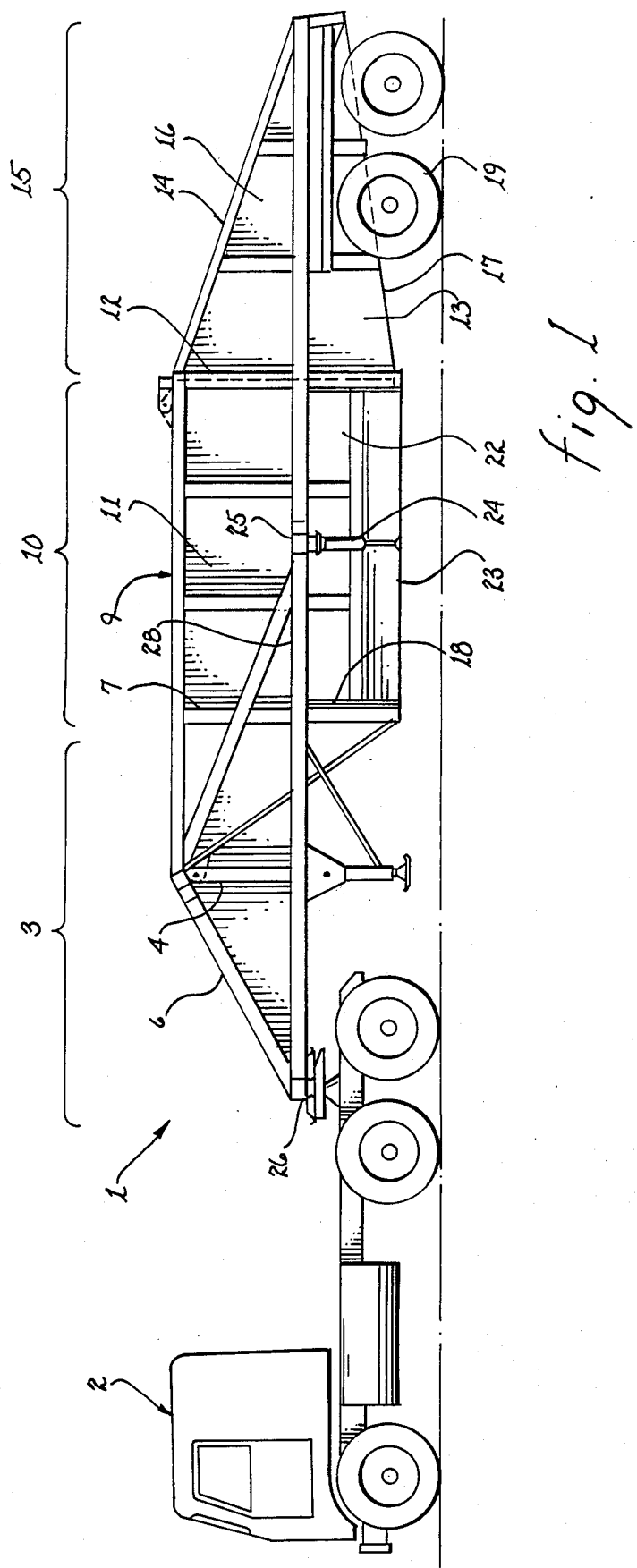
FIG. 1 shows the combination trailer in its normal usage configuration with a single hydraulic ram to operate the visible belly dump door.

Referring now to the drawings and particularly to FIG. 1, there is shown a combination bottom dump and back dump trailer, designated generally by the reference numeral 1. The trailer 1 is generally divided into three sections: a front end section 3, a hopper section 10, and a back end section 15. In a normal position, the front end section 3 of trailer 1 is coupled to truck 2 at coupling point 26. One or more lifting rams 4 are also contained in the front section 3. The front end section 3 includes a front frame 6 that is joined to the hopper section 10. The hopper section 10 comprises generally an area to hold the cargo 9, front wall 7, side walls 11 and a tailgate in the back of the hopper 12 to keep the cargo (not shown) enclosed while the truck/trailer combination is in motion or otherwise not actually making a delivery of the cargo material. Deflection baffles 18 can be added in behind the front wall to help ensure all material empties out when using the bottom dump mode. The tailgate swing area 13 must be kept clear so that tailgate 12 can swing open during a back dump delivery. The floor of the cargo area is formed by floor plates 22 and the bottom doors 23 when closed. The bottom doors 23 are operated by one or more door rams 24 and retract when opened to rest under the floor plates 22. The bottom doors 23 of the inventive vehicle could not be of the type normally used in the art. Conventional bottom doors are currently known in the art are opened with a pneumatic or hydraulic ram or rams inside the cargo area. These pneumatic or hydraulic rams push open the doors in a clam-type action allowing the material to fall out. In the instant invention, if the conventional mechanism were used, the rams to push open the bottom doors would be in the cargo area and prevent all the material from falling out in the back dump delivery. The door ram 24 is attached to the bottom frame member 28 of the hopper section 10 at door ram connecting point 25. The door ram 24 is mounted outside of the cargo holding area essentially parallel to the combination of floor plates 22 and bottom doors 23. This will prevent interference from the ram when cargo is being delivered using either the tail dump mode or the back dump mode. The back section 15 of trailer 1 comprises a chute area 14 and one or more wheel and axle assemblies 19. The chute area 14 comprises a bottom plate 17 and two side walls 16. The back section 15 of the trailer 1 rests on one or more axle and wheel combinations 19 to support the back of the trailer 1.

The top of the hopper 8 is typically open. Cargo is typically loaded into the cargo area 9 through the open top 8. The tailgate 12 in the back of the hopper section 10 is normally in a closed or down position to keep the cargo contained in the cargo area 9. The tailgate 12 is kept closed and locked while the trailer 1 is in motion by using any one of several tailgate locking mechanisms well known in the art today. The bottom of the hopper section 10 comprises a floor made up of floor plates 22 and bottom dump doors 23. In a closed position, the bottom dump doors 23 are held in position by bottom door slide shafts 20 and extended door rams 24. Closure of the bottom doors 23 is also assisted by gravity since bottom door slide shafts 20 force downward motion of the bottom doors 23 toward the center closed position. Bottom dump doors 23 can be closed even while there is cargo (not shown) in the cargo area 9 because of the pressure exertable by door rams 24.

If delivering material requiring a bottom dump, the trailer 1 would be positioned over the area upon which the material is to be dropped. The bottom dump doors 23 would then be opened. When opening, the bottom dump doors 23 slide upward and outward from the center and are held under floor plates 22 by retracted rams 24. Once the doors 23 are opened, the material (not shown) falls out. As the trailer 1 is pulled forwardly, more material falls out and eventually the cargo area 9 would be empty.

The installation of the bottom doors and rams is shown in more detail in FIGS. 9 and 10. The door 23 is held in place by a top belly door holding bar 38 and a bottom belly door holding bar 39. Both the top belly door holding bar 38 and bottom belly door holding bar 39 are attached to bottom door slide shafts 20 at either end of the holding bars. The top and bottom belly door holding bars 38 and 39 are attached to bottom door slide shafts 20 using two piece bolted design slide housings 37. These slide housings are very old and commonly known in the mechanical arts. As door opening ram 24 is shortened, door 23 slides up the bottom door slide shafts 20. Top belly door holding bar 38 has a cutout 40 to allow the top edge 43 of door 23 to slide above the position of the ram 24. Referring now specifically to FIG. 10, as the door 23 slides from its closed position 36 to its open position 35, it will be positioned below floor plates 22.

Figure 2:
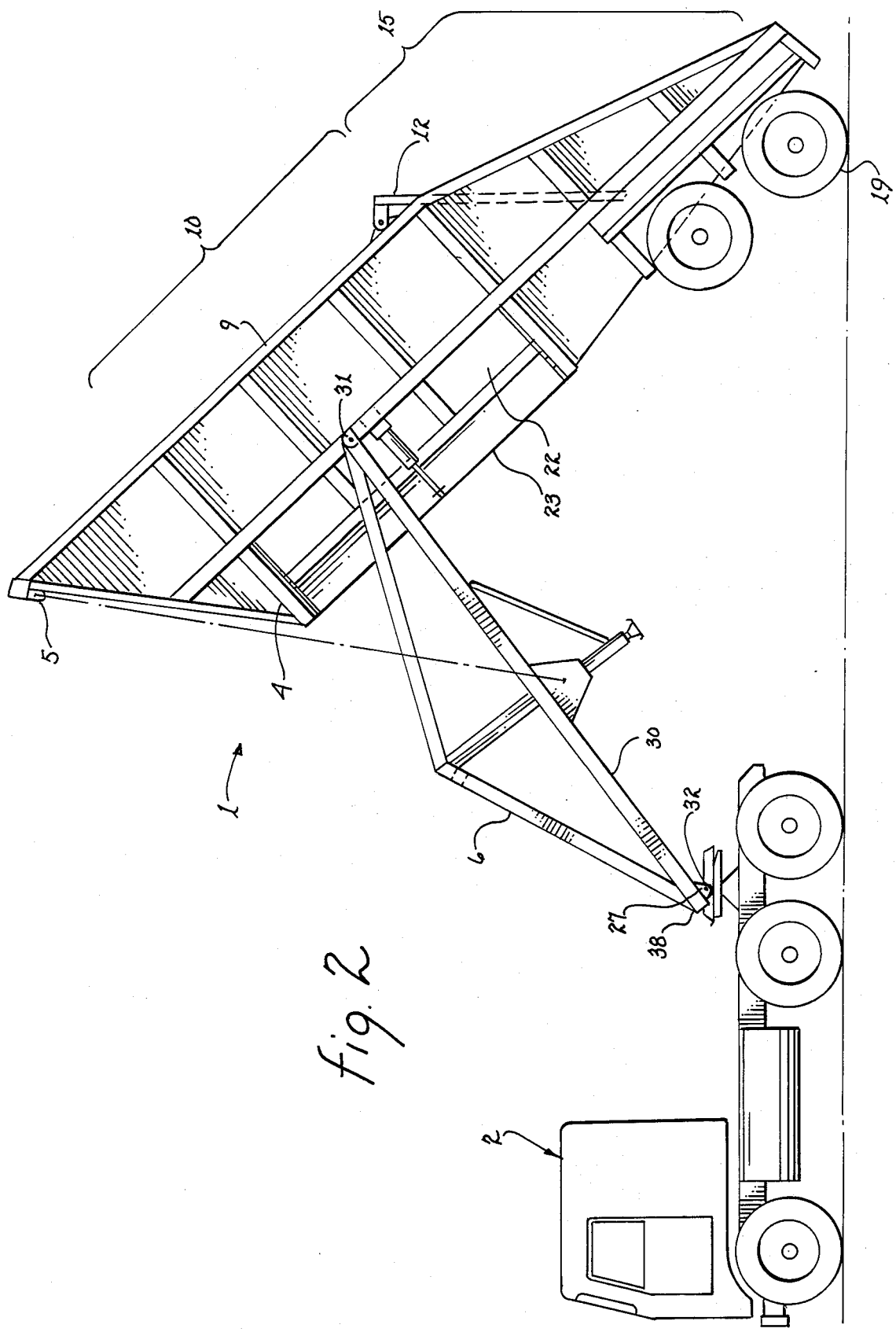
FIG. 2 shows the disclosed combination trailer in a back dump mode.
Figure 3:
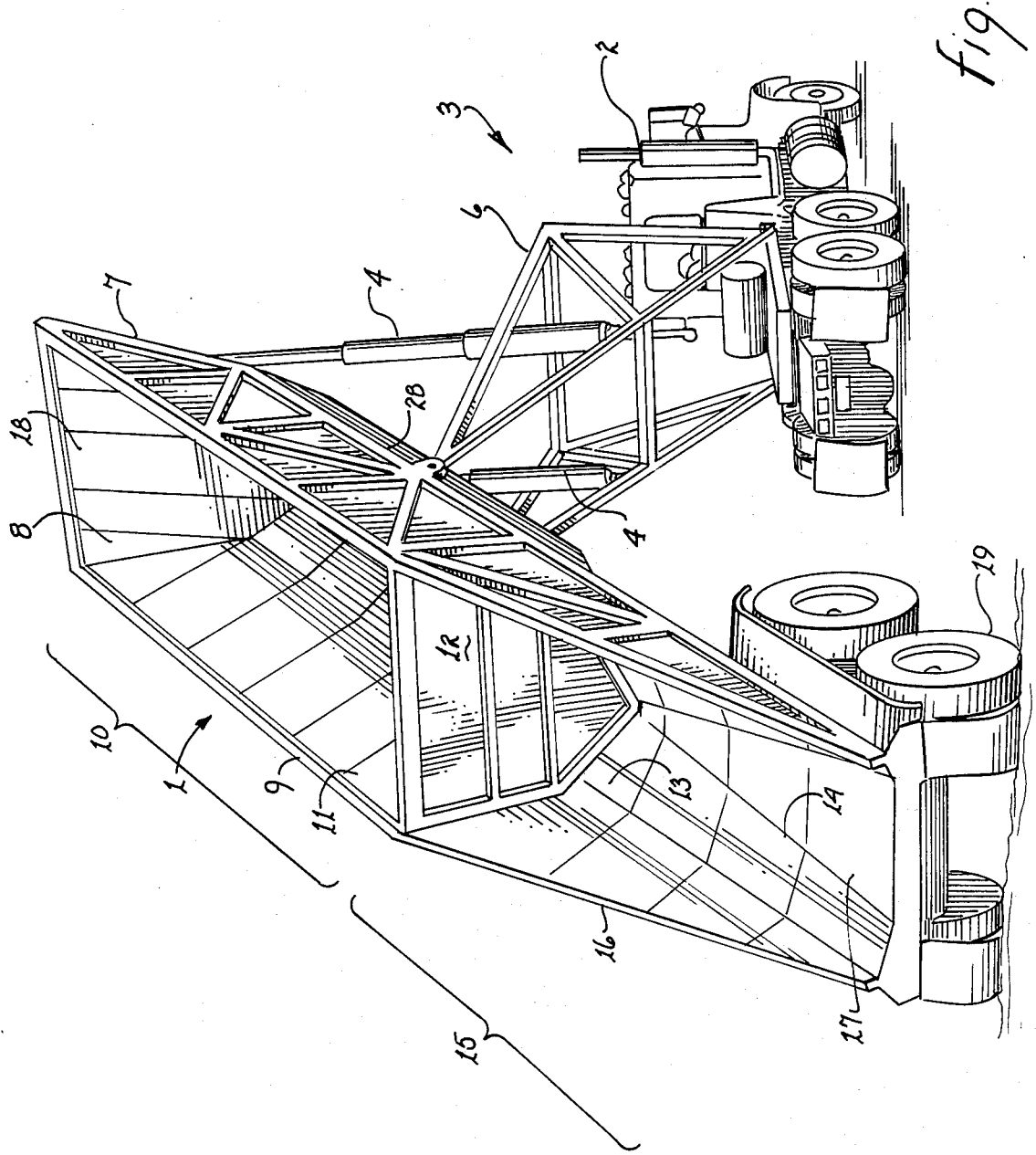
FIG. 3 shows a perspective view of the disclosed combination trailer in a back dump mode.
Figure 4:
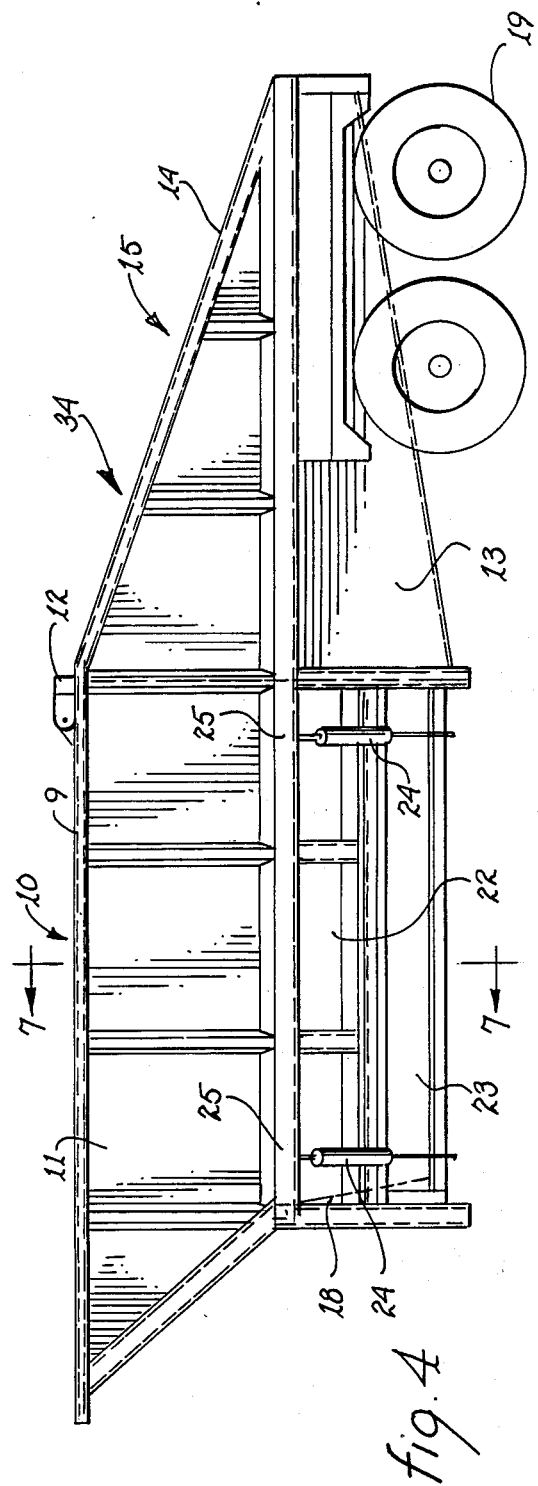
FIG. 4 shows the disclosed combination trailer without the front truss section and with two hydraulic rams to operate the visible belly dump door.
Figure 5:
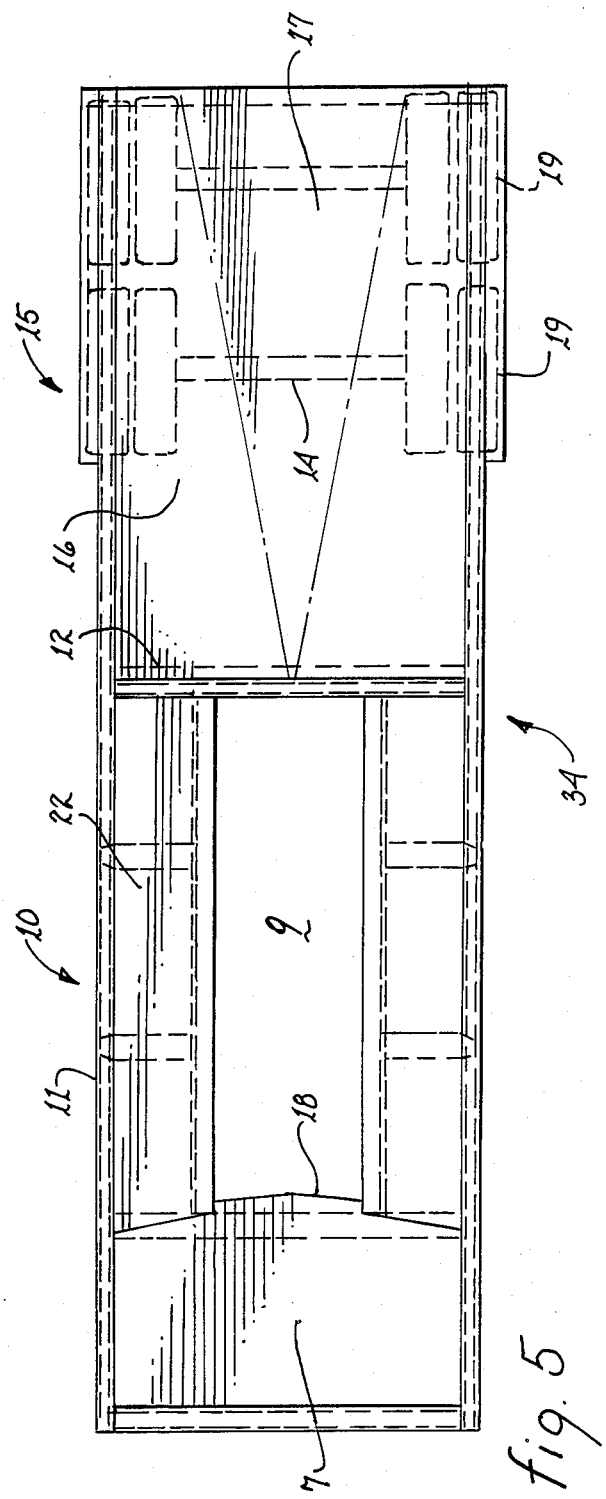
FIG. 5 shows a top view of the disclosed combination trailer with the bottom dump doors open.
Figure 8:
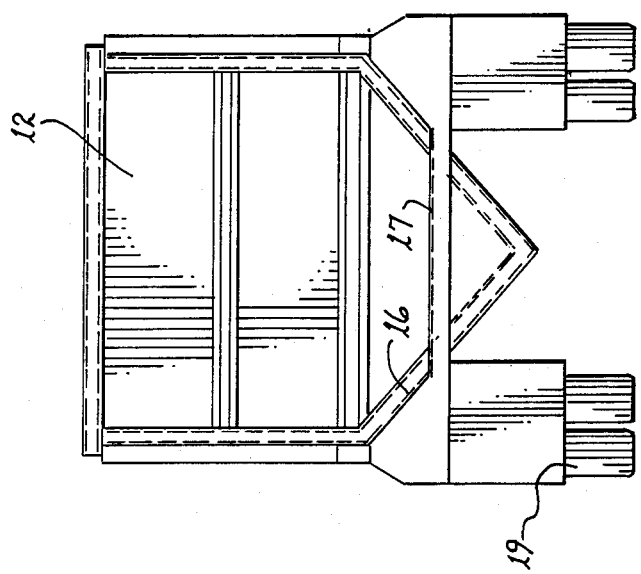
FIG. 8 shows an end view of the disclosed combination trailer.
Figure 7:
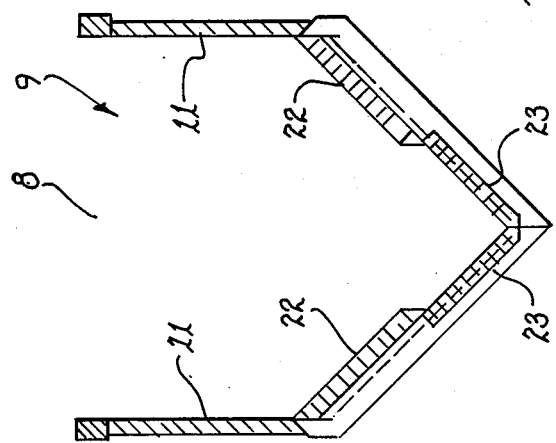
FIG. 7 shows a section view of the disclosed combination trailer. The section is taken at the cargo hold and belly dump door area.
Figure 6:
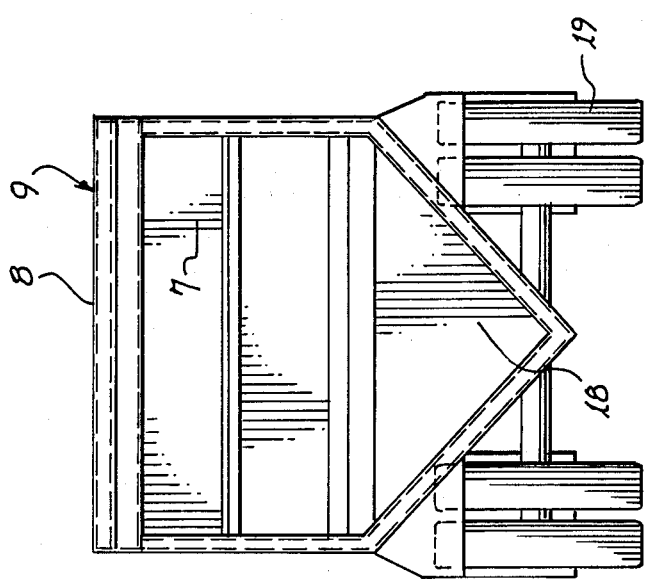
FIG. 6 shows a front view of the disclosed combination trailer.

Referring now to FIG. 2, an embodiment depicting a view of the trailer 1 while it is dumping cargo through the tailgate 12 is shown. The hopper section 10 and rear section 15 form a rigid section 34 which is tilted up to allow the cargo to fall out the tailgate 12. The front frame 6 of the front section 3 has a bottom member 30. This front frame bottom member 30 is joined at one end to the hopper section 10 at connecting point 31. The other end of the front frame bottom member 30 is connected to the connecting means 38 connecting the trailer 1 to the truck 2 at the bottom member/truck connecting point 32. The front frame bottom member 30 is free to rotate upwards about the bottom member/truck connecting point 32. One or more lifting rams 4 are connected between the front frame bottom member 30 and a connecting point 5 in the hopper section 10. The lifting rams are of any of the type well known in the art. For simplicity, the lifting rams 4 are represented by a dotted line. The bulk of the weight of the trailer 1 is supported by the lifting ram 4 and rear axle and wheel combination 19.

In a normal rest position, the hydraulic lifting rams 4 are retracted. Thus, the hopper section 10 is resting on the front weight bearing area 27 of the truck 2 and one or more of the axle and wheel assemblies 19. As the hydraulic power is applied to the lifting rams 4 forcing them to elongate, the connecting point 5 is forced up, tilting the rigid section 34 of the trailer 1. The rear tailgate 12 would be unlocked prior to tilting the rigid section 34 of trailer 1 up. As the trailer back section 15 is forced up, all the weight of the trailer is forced onto the rearmost axle and wheel combination 19. Any materials in the cargo area 9 (materials not shown) would fall out of the trailer and delivery would be complete. Once all material has fallen out, the lifting rams 4 would be retracted and the trailer would return to a normal rest position.

Because of the requirements of this configuration, the tailgate 12 used in this trailer must be of special fabrication. The bottom of the tailgate consists of two edges at an angle which corresponds to the angle of the floor plates 22 and bottom doors 23. The two bottom edges come to a point at approximately the midpoint of the tailgate. The inside of the tailgate has attached to it a plurality of deflection baffles to ensure that no material will be caught between the tailgate 12 and bottom floor plates 22 when material is either loaded or discharged using the bottom dump mode.

Another inventive feature of this trailer is the design of lifting and support means for back dump mode. Traditional back dump trailers will have the support members positioned toward the center of the trailer to allow more even weight distribution on the trailer components. In the inventive trailer, because of the requirement of keeping the middle of the trailer clear to allow the bottom dump mode to function, the major support members for the hopper are outside the side walls of the trailer and typically above the lowest point in the cargo area where cargo is kept.

While the invention has been particularly shown and described in reference to the preferred embodiments thereof, it will be understood by those skilled in the art that changes in the form and details may be made without departing from the spirit and scope of the invention.

I claim:

1. A combination rear dump and bottom dump trailer apparatus, comprising:
   attaching means to attach said trailer apparatus to a truck to pull said trailer apparatus;
   hopper means for holding cargo, said hopper means having a front end means a rear end means, two side means connecting said front end means and said rear end means, and a bottom means, said front end means, side means, rear end means and bottom means forming a container for said cargo;
   rear dump means for allowing dumping of cargo through said rear end means of said hopper means said rear dump means comprising a rear chute means for allowing said cargo to slide out of said hopper means while said front end means of said hopper means is elevated;
   bottom dump means for allowing dumping of cargo through said bottom means of said hopper means, said bottom dump means comprising:
   bottom door means for discharging cargo through said bottom means of said hopper means; and at least one power assisted operable door opening means for moving said bottom door means between open and closed positions, said bottom dump means being under said hopper means; and bottom dump power assist means to apply power to said bottom dump means.

2. The apparatus of claim 1 wherein said bottom door means comprises:
forward door holding means;
rearward door holding means; and
at least one bottom door member, said bottom door member guided by said forward door holding means and said rearward door holding means along the bottom of said hopper means, said bottom door member having forward attaching means at the one end for attaching to said forward door holding means and rearward attaching means at the other end for attaching to said rearward door holding means.

3. The apparatus of claim 2 wherein said forward door holding means and said rearward door holding means guide said bottom door member to the closed position when power is removed from said at least one power assisted operable door opening means.

4. The apparatus of claim 2 wherein said bottom door means further comprises:
a fixed bottom door member, said fixed bottom door member being above a movable bottom door member, said movable bottom door member sliding below said fixed bottom door member when said at least one power assisted operable door opening means applies power to move said movable bottom door member to the open position.

* * * * *